US010099309B2

United States Patent
Vigdal et al.

(10) Patent No.: US 10,099,309 B2
(45) Date of Patent: Oct. 16, 2018

(54) WIRE ARC ACCURACY ADJUSTMENT SYSTEM

(71) Applicant: Norsk Titanium AS, Hønefoss (NO)

(72) Inventors: Brede Vigdal, Hønefoss (NO); Hans-Martin Berg Haga, Hønefoss (NO); Tom-Erik Falla, Hønefoss (NO)

(73) Assignee: NORSK TITANIUM AS, Honefoss (NO)

( * ) Notice: Subject to any disclaimer, the term of this patent is extended or adjusted under 35 U.S.C. 154(b) by 0 days.

(21) Appl. No.: 15/792,616

(22) Filed: Oct. 24, 2017

(65) Prior Publication Data

US 2018/0043455 A1 Feb. 15, 2018

Related U.S. Application Data

(63) Continuation of application No. 15/206,171, filed on Jul. 8, 2016, now Pat. No. 9,821,399.

(51) Int. Cl.
| | |
|---|---|
| *B23K 9/00* | (2006.01) |
| *B23K 9/12* | (2006.01) |
| *B65H 57/26* | (2006.01) |
| *B23K 15/00* | (2006.01) |
| *B23K 26/342* | (2014.01) |
| *B23K 10/02* | (2006.01) |
| *B23K 9/04* | (2006.01) |
| *B33Y 40/00* | (2015.01) |

(52) U.S. Cl.
CPC .............. *B23K 9/124* (2013.01); *B23K 9/044* (2013.01); *B23K 10/027* (2013.01); *B23K 15/0086* (2013.01); *B23K 26/342* (2015.10); *B65H 57/26* (2013.01); *B33Y 40/00* (2014.12)

(58) Field of Classification Search
CPC ...... B23K 9/124; B23K 9/125; B23K 10/027; B23K 10/02; B23K 9/133; B23K 9/1336; B65H 57/26; B65Y 40/00
USPC .... 219/124.01, 76.15, 76.16, 137 R, 137.44, 219/137.31, 137.2, 121.47, 121.54
See application file for complete search history.

(56) References Cited

U.S. PATENT DOCUMENTS

| | | | | |
|---|---|---|---|---|
| 2,355,983 | A | * 8/1944 | Long | B23K 9/1336 191/1 R |
| 4,136,273 | A | 1/1979 | Eujita et al. | |
| 4,356,373 | A | * 10/1982 | Mattson | B23K 11/314 219/86.1 |
| 4,514,443 | A | * 4/1985 | Kostecki | B05C 7/08 118/215 |
| 4,531,040 | A | 7/1985 | Nawa et al. | |
| 4,540,879 | A | 9/1985 | Haerther et al. | |

(Continued)

FOREIGN PATENT DOCUMENTS

| | | |
|---|---|---|
| GB | 1506621 | 4/1978 |
| WO | 2006133034 | 12/2006 |

(Continued)

*Primary Examiner* — Mark Paschall
(74) *Attorney, Agent, or Firm* — Dentons US LLP

(57) ABSTRACT

Provided are a systems and methods for continuously providing a metal wire to a welding torch in the correct orientation with respect to the heat source of the welding torch for manufacturing objects by solid freeform fabrication to provide continuous deposition of metal to the freeform object, especially objects made with titanium or titanium alloy, or nickel or nickel alloy, wire.

21 Claims, 1 Drawing Sheet

(56) References Cited

U.S. PATENT DOCUMENTS

| | | | | |
|---|---|---|---|---|
| 4,664,587 | A | * | 5/1987 | Case, Jr. ................ B23K 9/287 219/124.1 |
| 4,952,769 | A | * | 8/1990 | Acheson ................ B23K 9/048 219/125.11 |
| 5,512,726 | A | * | 4/1996 | Arantes ................ B23K 9/1336 219/125.1 |
| 6,028,287 | A | * | 2/2000 | Passage ................ B23K 10/006 219/121.54 |
| 6,344,287 | B1 | | 2/2002 | Celik et al. |
| 6,610,958 | B2 | | 8/2003 | Stricklen |
| 6,657,161 | B2 | * | 12/2003 | Marhofer ............ B23K 9/0216 219/125.11 |
| 7,220,935 | B2 | | 5/2007 | Ireland et al. |
| 7,485,826 | B2 | * | 2/2009 | Borne .................... B23K 9/173 219/137 R |
| 7,892,597 | B2 | | 2/2011 | Hooker et al. |
| 9,145,832 | B2 | | 9/2015 | Comon et al. |
| 9,254,984 | B2 | | 2/2016 | Christopher et al. |
| 9,731,385 | B2 | * | 8/2017 | Miller ................ B23K 37/0211 |
| 2002/0158048 | A1 | * | 10/2002 | Stricklen ............ B23K 9/1336 219/75 |
| 2006/0185473 | A1 | | 8/2006 | Withers et al. |
| 2010/0193480 | A1 | | 8/2010 | Adams |
| 2010/0276396 | A1 | | 11/2010 | Cooper et al. |
| 2010/0301019 | A1 | * | 12/2010 | Vos .................... B23K 37/0258 219/121.39 |
| 2013/0140280 | A1 | | 6/2013 | Biskup et al. |
| 2014/0061165 | A1 | | 3/2014 | Stempfer |
| 2014/0263255 | A1 | | 9/2014 | Garvey et al. |

FOREIGN PATENT DOCUMENTS

| | | |
|---|---|---|
| WO | 2011019287 | 2/2011 |
| WO | 2014203069 | 12/2014 |

* cited by examiner

WIRE ARC ACCURACY ADJUSTMENT SYSTEM

This application is a continuation application of prior U.S. patent application Ser. No. 15/206,171, filed Jul. 8, 2016, the entire contents of which are incorporated herein by reference.

FIELD OF THE INVENTION

The present application relates to a system and method of maintaining the accurate placement of a distal end or tip of a metal wire into the arc of a welding torch for manufacturing objects by solid freeform fabrication, especially objects made from titanium and titanium alloy, or nickel or nickel alloy, wire.

BACKGROUND OF THE INVENTION

Structured metal parts made of titanium or titanium alloys are conventionally made by casting, forging or machining from a billet. These techniques have a disadvantage of high material use of the expensive titanium metal and large lead times in the fabrication.

Fully dense physical objects may be made by a manufacturing technology known as rapid prototyping, rapid manufacturing, layered manufacturing, solid freeform fabrication (SFFF), additive fabrication, additive manufacturing and 3D printing. This technique employs computer aided design (CAD) software to first construct a virtual model of the object which is to be made, and then transform the virtual model into thin parallel slices or layers, usually horizontally oriented. The physical object may then be made by laying down successive layers of raw material in the form of liquid, paste, powder or other layerable, spreadable or fluid form, such as melted metal, e.g., from a melted welding wire, or preformed as sheet material resembling the shape of the virtual layers until the entire object is formed. The layers can be fused together to form a solid dense object.

Solid freeform fabrication is a flexible technique allowing creation of objects of almost any shape at relatively fast production rates, typically varying from some hours to several days for each object. The technique is thus suited for formation of prototypes and small production series, and can be scaled-up for large volume production.

The technique of layered manufacturing may be expanded to include deposition of pieces of the construction material, that is, each structural layer of the virtual model of the object is divided into a set of pieces which when laid side by side form the layer. This allows forming metallic objects by welding a wire onto a substrate in successive stripes forming each layer according to the virtual layered model of the object, and repeating the process for each layer until the entire physical object is formed. The accuracy of the welding technique is usually too coarse to allow directly forming the object with acceptable dimensions. The formed object will thus usually be considered a green object or pre-form which needs to be machined to acceptable dimensional accuracy.

It is known to use a plasma arc to provide the heat for welding metallic materials. This method may be employed at atmospheric or higher pressures, and thus allow the use of simpler and less costly process equipment. One such method is known as gas tungsten arc welding (GTAW, also denoted as tungsten inert gas (TIG) welding) where a plasma transferred arc is formed between a non-consumable tungsten electrode and the welding area. The plasma arc is usually protected by a gas being fed through the plasma torch forming a protective cover around the arc. TIG welding may include feeding a metal wire or metal powder into the melting pool or the plasma arc as a filler material.

It is known (e.g., see Adams, U.S. Pat. Pub. No. 2010/0193480) to use a TIG-welding torch to build objects by solid freeform fabrication (SFFF), where successive layers of metallic feedstock material with low ductility are applied onto a substrate. A plasma stream is created by energizing a flowing gas using an arc electrode, the arc electrode having a variable magnitude current supplied thereto. The plasma stream is directed to a predetermined targeted region to preheat the predetermined targeted region prior to deposition. The current is adjusted and the feedstock material, such as a metal wire, is introduced into the plasma stream to deposit molten feedstock in the predetermined targeted region. The current is adjusted and the molten feedstock is slowly cooled at an elevated temperature, typically above the brittle to ductile transition temperature of the feedstock material, in a cooling phase to minimize the occurrence of material stresses.

Withers et al. (U.S. Pat. Pub. No. 2006/185473) also describes using a TIG torch in place of the expensive laser traditionally used in a SFFF process with relatively low cost titanium feed material by combining the titanium feed and alloying components in a way that considerably reduces the cost of the raw materials. Withers et al. teaches that an unalloyed commercially pure titanium wire (CP Ti wire) which is lower in cost than alloyed wire can be used, and the CP Ti wire can be combined with powdered alloying components in-situ in the SFFF process by combining the CP Ti wire and the powder alloying components in the melt of the welding torch or other high power energy beam. Wither et al. also teaches that titanium sponge material can be mixed with alloying elements and formed into a wire where it may be used in an SFFF process in combination with a plasma welding torch or other high power energy beam to produce near net shaped titanium components.

Abbott et al. (WO 2006/133034, 2006) describes a direct metal deposition process using a laser/arc hybrid process to manufacture complex three-dimensional shapes comprising the steps of providing a substrate and depositing a first molten metal layer on the substrate from a metal feedstock using laser radiation and an electric arc. The electric arc can be provided by gas metal arc welding torch using the metal feedstock as an electrode. Abbott et al. teaches that the use of laser radiation in combination with gas metal arc welding stabilizes the arc and purportedly provides higher processing rates. Abbott et al. utilizes a consumable electrode guided by and exiting out of a wire guide. The metal of the consumable electrode is melted at the end and the molten metal is deposited by positioning the end over the deposition point. The required heat for melting the consumable electrode can be supplied by an electric arc expanding between the tip of the electrode and the workpiece/deposition substrate, and by a laser irradiating the deposition area. Welding by melting a consumable electrode heated by an electric arc is known as gas metal arc welding (GMAW), of which in the case of using non-reactive gases to make the arc is also denoted as metal inert gas welding (MIG-welding).

In order to effectively deposit metal from a metal wire unto the surface of a work piece using a welding torch, it is necessary to maintain the metal wire in the correct position relative to the welding torch. If the metal wire is not maintained within the arc, it will not melt properly or be deposited in the correct position.

Accordingly, there exists a need in this art for an economical method of performing direct metal deposition at an increased rate of metal deposition while maintaining the metal wire in the proper position within the arc of the welding torch.

SUMMARY OF THE INVENTION

An objective of the present invention is to provide a system for delivery of metal wire to a welding torch and to maintain the metal wire in the heat source emitted by the welding torch, such as the arc of a plasma arc welding torch, for building metallic objects by solid freeform fabrication. The welding torch includes a heat source, such as a plasma transferred arc (PTA) torch, an electron beam, or a laser, or a combination thereof, to melt a metal wire.

Provided herein is a system that maintains the metal wire in the correct position relative to the heat source emitted by the welding torch to provide a constant supply of melted metal to the molten pool on the surface of the work piece so that there are no unintentional gaps or imperfections in the layer of metal added to the work piece.

Another objective of the invention is to provide a method for rapid layered manufacture of objects in titanium or titanium alloys, or nickel or nickel alloys, using a metal wire and one or more welding torches. This invention addresses the needs for an improved, economical method of performing direct metal deposition by providing systems and methods for delivery of metal wire to a welding torch to a desired location with respect to the welding torch, which can result in increased speeds of deposition of metal in solid freeform fabrication. This invention further addresses the need for a method of increasing throughput and yield of distortion-free direct metal deposition formed parts with smooth, well-defined deposition boundaries. It is noted that although the invention is described in correlation with the use of a metal wire, any conductive structure that can be guided and melted to deposit material can be used, for example any consumable electrode of appropriate size and shape can be used.

Provided herein are metal wire positioning systems that include a fixed main support frame 900 and an adjustable guide support frame 500 rotatably connected to the main support frame 900 by a holding unit via a pivot joint 800 and suspended by a rotatable support piston 810. A plate 920 is fixedly attached to the main support frame 900. The plate 920 includes an internally threaded opening. A motor 570 is attached to the adjustable guide support frame 500, and the motor 570 can be attached to a threaded member that is engaged with the internally threaded opening in plate 920. A welding torch 600 can be fixedly attached to the main support frame 900. A second welding torch 610 also can be fixedly attached to the main support frame 900. The holding unit can include a support 820 containing a rotatable support piston 810 engaged with a pivot joint 800, and a connector 830 connected to the rotatable support piston 810 and pivotably supporting the rotatable support piston 810, the support 820 fixedly attached to the main support frame 900. The system includes a detector 700 that detects the position of the heat source emitted by a welding torch, such as the arc of welding torch 600. It is noted that although the invention is described in correlation with the arc of a PTA torch, the system provided herein can be used to reposition the end of a metal wire into any heat source of a welding torch, such as a plasma arc of a PAW or PTA welding torch, or an electron beam of an electron beam welding torch, or a laser beam of a laser welding torch.

The motor 570 can be in communication with a control system that can control the movement of the threaded member. The control system can control the amount and the direction that the threaded member is rotated by motor 570. The threaded member can be a screw or bolt. Rotation of the threaded member by the motor 570 in one direction repositions the adjustable guide support frame 500 toward the fixed main support frame 900, and rotation of the threaded member by the motor 570 in the opposite direction repositions the adjustable guide support frame 500 away from the fixed main support frame 900. This results in the distal end of metal wire 180 being repositioned. For example, rotation of the threaded member by the motor 570 clockwise can reposition the adjustable guide support frame 500 toward the fixed main support frame 900, and rotation of the threaded member by the motor 570 counterclockwise can reposition the adjustable guide support frame 500 away from the fixed main support frame 900. Alternatively, rotation of the threaded member by the motor 570 counterclockwise can reposition the adjustable guide support frame 500 toward the fixed main support frame 900, and rotation of the threaded member by the motor 570 clockwise can reposition the adjustable guide support frame 500 away from the fixed main support frame 900.

The control system can include a computer processer or central processing unit (CPU), CPU display, one or more power supplies, power supply connections, signal modules as inputs and/or outputs, integrated shielding of analog signals, storage devices, circuit boards, memory chips or other storage medium, a non-transitory computer-readable storage medium having a computer-readable program embodied therein, or any combination thereof. The computer-readable program can contain appropriate software for partially or completely automating any one or combination of systems. The computer-readable program can contain appropriate software for monitoring and/or adjusting a parameter, such as rotation of the threaded member, motor speed, temperature, pressure, position of the workpiece, deposition rate, or any combination thereof. Exemplary control systems include, but are not limited to, the SIMATIC-S7-1500 from Siemens AG (Munich, Germany), the IndraMotion MTX system available from Bosch Rexroth AG (Lohr am Main, Germany), and the SIGMATEK C-IPC compact industrial computer system available from SIGMATEK GmbH & Co. KG (Lamprechtshausen, Austria).

Appropriate adjustment during the manufacturing process can maintain the distal end of the metal wire 180 in the desired location relative to the arc of the welding torch 600 to provide a continuous supply of metal wire to the torch in the appropriate position so that the metal wire can be melted by the torch into the molten pool on the work piece. The rotational movement of the threaded member adjustably repositions the adjustable guide support frame to reposition the wire with respect to the heat source emitted by the welding torch, such as the plasma arc of a plasma arc welding torch. A movable sleeve that encircles the threaded member can be included to protect the threaded member. The motor 570 can be a direct current motor driven by a power control signal or can be a stepper motor. When the motor 570 is a stepper motor, a precise amount of rotation of the threaded member in either direction can be achieved by electronically controlling the number of energizing pulses supplied to the motor.

In the systems provided herein, the detector 700 can be attached to the adjustable guide support frame 500 by a detector support 710. The detector 700 can include a camera, a video camera, a video sensor or combinations thereof. The camera can be a charge coupled device (CCD) camera. Color or black and white images of the heat source emitted by the welding torch, such as the plasma arc of a plasma arc welding torch, and the position of the distal end of the metal wire 180 can be captured by the detector. The field of view of the camera can be adjusted so that the distal end of the metal wire 180 is generally within the center of the field of view of the camera. A band pass filter can be placed in front of the camera in order to filter out noise or to reduce the amount of light produced by the heat source emitted by the welding torch received by the camera in order to improve the visualization of the distal end of the metal wire 180. In some embodiments, the detector 700 can include a camera to provide visual detection of the molten metal droplets from the metal wire. The angle of droplet transfer can be measured to gauge accuracy. Deviation in the angle of droplet transfer can be a parameter used make adjustments in the position of the distal end of the metal wire in the heat source emitted by a welding torch. The deviation in the angle of droplet transfer can be used alone or with other parameters to determine whether adjustment of the position of the wire is necessary. When necessary, the adjustments can be made in real time manually based on the image from the camera. The adjustments can be made in real time automatically based on image analysis of the image from the camera, e.g., the angle of droplet transfer.

The systems also can include a master feed device containing a first motorized wire feeder 475, a motor 470, a rotation counter 465, and a second motorized wire feeder 460. The motor 470 can be operatively connected to the first motorized wire feeder 475 and the second motorized wire feeder 460. The rotation counter 465 can be positioned between the first motorized wire feeder 475 and the second motorized wire feeder 460. The system also can include a rotation counter 480 positioned before the first motorized wire feeder 475. The master feed device can monitor for slippage of the metal wire 180 to make sure that no kinks, bends or other permanent deformations are introduced into the metal wire 180 as it traverses the wire supply system. Slippage can be detected by comparing the rotation of the free wheel device 485 measured by rotation counter 480 to the rotation of the master feeder measured by rotation counter 465.

In the systems provided herein, the fixed main support frame 900 or the adjustable guide support frame 500 or both can include one or more than one cut-out, perforation or hole 550. The cut-outs, perforations or holes allow dissipation of heat. Excess heat can cause deformation of the frame. The cut-outs, perforations or holes in the frames are designed to maximize heat dissipation while minimizing any detrimental effect on mechanical strength of the frame so that the frame can physically withstand the tensile, shear, and torsional forces of supporting elements attached to the frame.

A support element 300 can be attached to the adjustable guide support frame 500. A guide 120 and a contact tip assembly 210 can be attached to the support element 300. The contact tip assembly 210 can include a replaceable contact tip.

Also provided are methods of providing a metal wire to a welding torch. The methods include advancing an amount of the metal wire from a wire supply source through a guide so that a distal end of the metal wire is positioned in the heat source emitted by a welding torch, detecting the position of the distal end of the metal wire relative to the heat source emitted by the welding torch, and adjusting the position of the distal end of the metal wire by repositioning an adjustable frame to which the guide is attached. In the methods provided, the adjustable frame can be rotatably attached to a fixed frame by a holding unit that includes a support containing a rotatable support piston engaged with a pivot joint, and a connector connected to the rotatable support piston and pivotably supporting the rotatable support piston, the support fixedly attached to the fixed frame.

In the methods, the adjustable frame can be repositioned by activating a repositioning motor attached to a threaded member that is engaged with an internally threaded opening in a plate attached to the fixed frame and rotating the threaded member by the repositioning motor in one direction repositions the adjustable frame toward the fixed frame, and rotating the threaded member by the repositioning motor in the opposite direction repositions the adjustable frame away from the fixed frame. The repositioning motor can be a stepper motor and the number of energizing pulses supplied to the motor can be controlled to provide a precise amount of rotation of the threaded member in either direction. The repositioning motor can be operated using a motor controller that modulates the power provided to the motor, or regulates the speed and direction and duration of movement of the motor, or permits automatic of activation of the motor in response to a signal, or any combination thereof.

In the instant methods, the master feed device can include a first motorized wire feeder, a wire drive motor, a rotation counter, and a second motorized wire feeder, the wire drive motor driving the first and second motorized wire feeders to advance the metal wire to the heat source emitted by the welding torch. The wire drive motor of the master feed device can be a direct current motor driven by a power control signal or a stepper motor. Detecting the position of the distal end of the metal wire comprises visualizing the distal end of the metal wire using a detecting device. The detecting device can include a camera. The camera can be a complementary metal-oxide-semiconductor (CMOS) camera, a charge coupled device (CCD) camera or a combination thereof. The detecting device can generate an image that can be turned into a digital representation of the light pattern detected, and in response to the digital representation, the distal end of the metal wire can be repositioned. The adjustable frame can be repositioned by activating a repositioning motor attached to a threaded member that is engaged with an internally threaded opening in a plate attached to the fixed frame. Rotating the threaded member by the repositioning motor in one direction repositions the adjustable frame toward the fixed frame, and rotating the threaded member by the repositioning motor in the opposite direction repositions the adjustable frame away from the fixed frame. The repositioning motor can be a stepper motor and the number of energizing pulses supplied to the motor can be controlled to provide a precise amount of rotation of the threaded member in either direction.

The wire supply source can be a spool on which the metal wire is wound, and the methods can include unwinding the metal wire from the spool to advance metal wire to the master feed system. In the methods provided, the master feed system can include grooved rollers in frictional contact with the metal wire. Rotating the grooved rollers advances the metal wire. Rotating the grooved rollers can be accomplished by activating a motor attached to the one or more of the grooved rollers. The methods provide metal wire to an appropriate location of a welding torch so that the welding torch can melt the wire. The welding torch includes a heat source. Examples of devices that can be used to melt the metal wire include a plasma arc welding (PAW) torch, such as a transferred arc (PTA) torch, an electron beam welding torch, or a laser welding torch, or a combination thereof.

An exemplary PAW torch is a PTA torch. The PTA torch can be of any configuration capable of creating an electric arc to heat and melt the metal wire, such as gas metal arc welding (GMAW), particularly using non-reactive gases to make the arc. The metal wire is used as a metal wire and is melted in the plasma produced by torch using an electric arc, and the melting metal wire is deposited into the molten pool on the workpiece to add to, and to form, the near net shape metal bodies.

The welding torch can be a laser welding torch. The laser welding torch generates a laser beam of sufficient thermal energy to melt the metal wire onto a base material. Examples of suitable laser welding torch can include a neodymium-doped yttrium aluminum garnet (Nd:YAG) laser, a $CO_2$ laser, a CO laser, a ytterbium fiber coupled diode laser, a Nd:glass laser, a neodymium-doped yttrium orthovanadate (Nd:YVO) laser, a Cr:ruby laser, a diode laser, a diode pumped laser, an excimer laser, a gas laser, a semiconductor laser, a solid-state laser, a dye laser, an X-ray laser, a free-electron laser, an ion laser, a gas mixture laser, a chemical laser, and combinations thereof. Preferred are Nd:YAG lasers and $CO_2$ lasers.

The welding torch can be an electron beam welding torch that can include an electron beam device for heating and melting a metal wire onto a base material. The electron beam welding torch can be arranged and disposed to direct an electron beam on an end of a metal wire positioned above the base material, such as above a molten pool in the base material, so that the thermal energy produced by the electron beam of the electron beam device melts the end of the wire, forming droplets of molten metal wire that drop onto the base material or into the molten pool beneath the end of the metal wire. The electron beam of the electron beam welding torch also can contribute thermal energy to or in the vicinity of the molten pool.

The electron beam welding torch can have a variable power output that can be adjusted to provide a substantially constant power or energy amount to the metal wire in an amount that provides substantially constant melting rate of the metal wire. The power or energy delivered by the electron beam welding torch can be modulated depending on the constitution of the metal wire so that the metal wire can be fed at a constant rate and is melted onto the base material or into a molten pool on the base material. The electron beam welding torch can include a single electron beam gun or more than one electron beam gun.

The electron beam welding torch can be operated so that the beam current is substantially constant, or can be operated so that the beam current can be varied during the melting of the metal wire and deposition of the molten metal wire onto the work piece or into the molten pool on the work piece. The detector can be used to detect electrons produced by the electron beam welding torch, or to monitor the melting of the metal wire.

Electron beam welding torches are commercially available and described in the art. The electron beam welding torch can be selected so that it contains electromagnetic coils to modulate the electron beam. The electron beam gun can provide energy in the form of a stream of focused electrons accelerated towards the work piece. The electrons can be accelerated using a high voltage potential (e.g., greater than about 15 kV, such as in the range of from about 15 kV to about 150 kV). The electrons may be generated within the electron beam welding torch using one or more heated filaments. The power output of the electron beam welding torch typically can be controlled by limiting or modulating the flow of electrons to the work piece. For example, an electron beam power of up to about 30 kW can be used, but generally is within the range of from about 2.5 kW to about 10 kW, or from about 3 kW to about 6 kW. The electron beam current generally is greater than about 100 milliamps, and can be in the range of from about 100 milliamps to about 600 milliamps. The electron beam power is variable, and is generated by using an input voltage in the range of from about 100 V to about 500 V. An exemplary input voltage is about 110 V.

Also provided are methods for manufacturing a three-dimensional object of a metallic material by solid freeform fabrication, where the object is made by fusing together successive deposits of the metallic material onto a base material, the methods including using a first heating device to preheat at least a portion of the surface of a base material, up to an including forming a molten pool on the surface of the base material at the position at which the metallic material is to be deposited; providing a metal wire to a second heating device at a position where second heating device can heat and melt the metal wire such that molten metallic material from the melted wire is deposited onto the base material and onto the preheated or molten or partially molten area of the base material if preheating was carried out, and moving the base material relative to the position of the first and second heating devices in a predetermined pattern such that the successive deposits of molten metallic material solidifies and forms the three-dimensional object. Movement of the base material relative to the heating devices can be accomplished by moving the base material while keeping the one or more heating devices in a fixed position, moving the one or more heating devices while keeping the base material in a fixed position, or moving the base material and the one or more heating devices. The movement of the base substrate and one or more heating devices can be accomplished with the use of one or more actuators, such as mechanical, hydraulic, and/or robotic arms, moving pedestals or supports, rails, tracks or like devices. The method can utilize a PTA torch as the first and second heating device. A PTA torch can be electrically connected to a direct current power source such that the electrode of the PTA torch becomes the cathode and the metal wire becomes the anode. In some systems, the heating device used to form the molten pool in the base material can be a laser, alone or in combination with another laser or a PTA torch, or an electron beam gun, alone or in combination with another electron beam gun or a laser.

Also provided are methods of providing a metal wire to a welding torch. The methods can include as steps advancing an amount of the metal wire from a wire supply source so that a distal end of the metal wire is positioned in a heat source emitted by a welding torch; continuously detecting the position of the distal end of the metal wire relative to the heat source emitted by the welding torch; and adjusting the position of the distal end of the metal wire to ensure that it is located within the heat source.

Additional features and advantages of the invention will be set forth in the description which follows, and in part will be apparent from the description, or can be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is included to provide a further understanding of the invention and is incorporated in and constitutes a part of this specification, illustrates an embodiment of the invention and together with the description serves to explain the principles of the invention.

In the drawing.

DETAILED DESCRIPTION

A. Definitions

Figure 1:
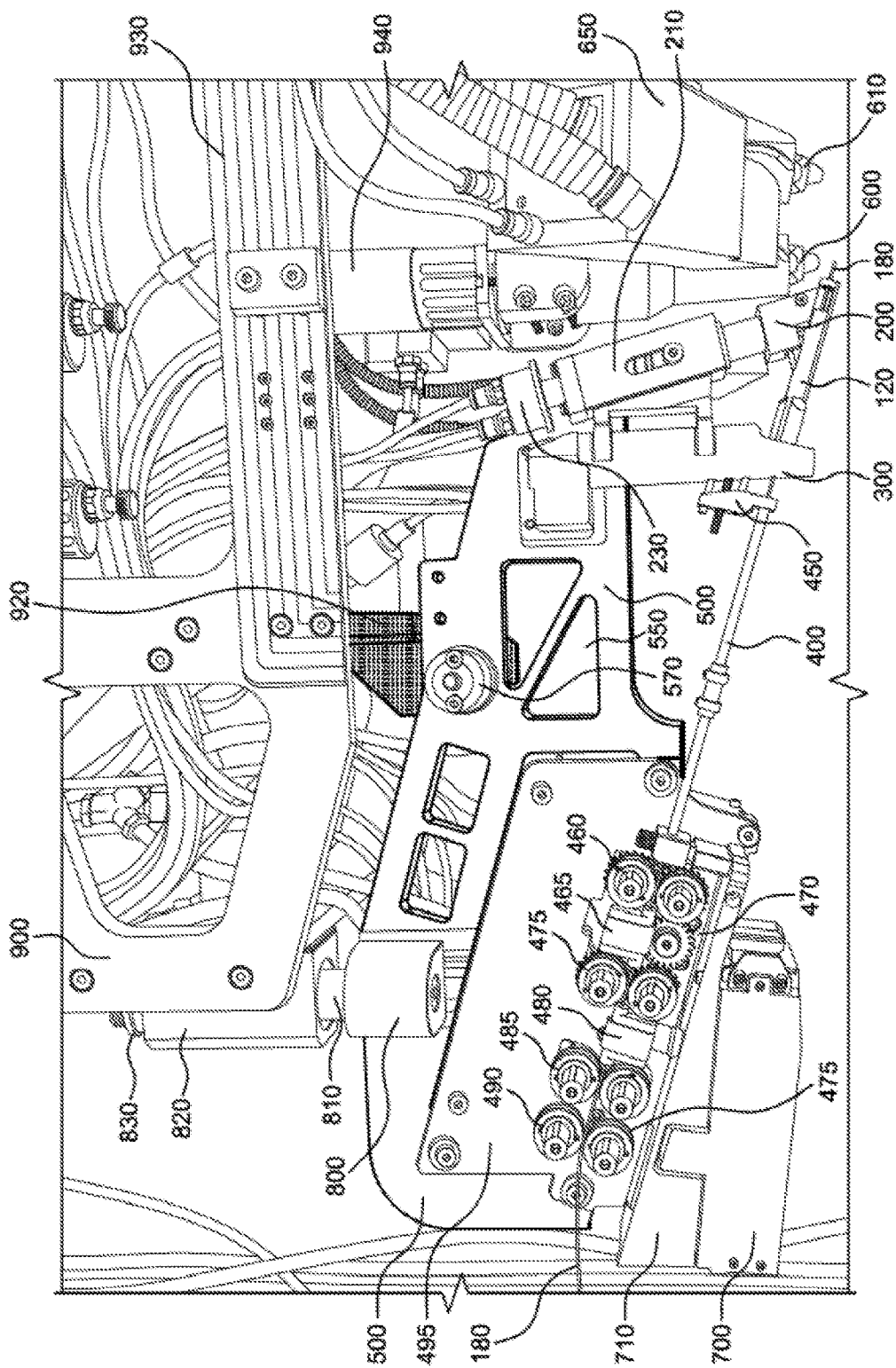
FIG. 1 is a schematic side view of an embodiment of the metal wire accuracy adjustment system provided herein showing the adjustable guide support frame 500 to which the components of the metal wire supply system are attached, rotatably connected to the main support frame 900 by a holding unit that includes a pivot joint 800, a rotatable support piston 810 engaged with the pivot joint 800, a support 820 that encompasses the rotatable support piston 810, and a connector 830 connected to the rotatable support piston 810 and pivotably supporting the rotatable support piston 810.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, a "combination" refers to any association between two items or among more than two items. The association can be spatial or refer to the use of the two or more items for a common purpose.

As used herein, a "Plasma Arc Welding torch" or "PAW torch" refers to a welding torch that can be used in plasma arc welding. The torch is designed so that a gas can be heated to a high temperature to form plasma and becomes electrically conductive, the plasma then transfers an electric arc to a workpiece, and the intense heat of the arc can melt metal and/or fuse two pieces of metal together. A PAW torch can include a nozzle for constricting the arc thereby increasing the power density of the arc. The plasma gas typically is argon. Plasma gas can be fed along the electrode and ionized and accelerated in the vicinity of a cathode. The arc can be directed towards the workpiece and is more stable than a free burning arc (such as in a TIG torch). The PAW torch also typically has an outer nozzle for providing a shielding gas. The shielding gas can be argon, helium or combinations thereof, and the shielding gas assists minimizing oxidation of the molten metal. In a PAW torch, the current typically can be up to about 400 A, and the voltage typically can be between about 25-35 V (but can be up to about 14 kW). The invention is not tied to any specific choice or type of PAW torch. Any known or conceivable device able to function as PAW torch can be used. An exemplary PAW torches is a plasma transferred arc (PTA) torch.

The term "plasma transferred arc torch" or "PTA torch" as used interchangeably herein refers to any device able to heat and excite a stream of inert gas to plasma by an electric arc discharge and then transfer the flow of plasma gas including the electric arc out through an orifice (such as a nozzle) to form a constricted plume that extends out of the orifice and transfers the intense heat of the arc to a target region. The electrode and target region can be electrically connected to a direct current power source such that the electrode of the PTA torch becomes the cathode and the target region becomes the anode. This will ensure that the plasma plume including electric arc is delivering a highly concentrated heat flow to a small surface area of the target region with excellent control of the areal extension and magnitude of the heat flux being supplied from the PTA torch. A plasma transferred arc has the advantage of providing stable and consistent arcs with little wandering and good tolerance for length deviations between the cathode and anode. Thus, the PTA torch is suitable both for forming a molten pool in the base material and to heat and melt the metallic wire feed. The PTA torch may advantageously have an electrode made of tungsten and a nozzle made of copper. However, the invention is not tied to any specific choice or type of PTA torch. Any known or conceivable device able to function as PTA torch can be used.

The term "power density" as used herein refers to an amount of power that is distributed to a unit area, such as from a plasma arc, a laser beam or an electron beam.

As used herein, the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "metallic material" as used herein refers to any known or conceivable metal or metal alloy that may be formed into a wire and employed in a solid freeform fabrication process to form a three-dimensional object. Examples of suitable materials include, but are not limited to; titanium and titanium alloys such as i.e. Ti-6Al-4V alloys.

The term "similar metallic material" as used herein means that the metallic material is of the same metal or metal alloy as the reference metallic material.

The term "holding substrate" as used herein refers to the target substrate upon which additional material, the same or different from that of the holding substrate, is deposited using the technique of SFFF or solid free form fabrication to form a workpiece. In exemplary embodiments, the holding substrate is a flat sheet. In alternative embodiments, the holding substrate may be a forged part. In alternative embodiments, the holding substrate may be an object upon which additional material is to be deposited. In exemplary embodiments, the holding substrate can become part of the workpiece. The material for the holding substrate can be a metal or a metal alloy. In exemplary embodiments, the holding substrate is made of the same metal as the wire feed material.

The term "base material" as used herein refers to the target material for receiving molten metallic material for forming a three-dimensional object. The base material will be the holding substrate when depositing the first layer of metallic material. When one or more layers of metallic material have been deposited onto the holding substrate, the base material will be the upper layer of deposited metallic material that is to have deposited a new layer of metallic material.

As used herein, "frictionally enhanced surface" refers to a surface that has been modified to exhibit more friction than an untreated smooth surface of the same material. Modifications to the surface that enhance friction can include roughening the surface, or including protrusions on the surface, or providing a gritted surface. The modified surface enhances frictional contact (in comparison to a non-modified surface) with the modified surface and another surface, such as a metal wire in contact with the surface, to minimize slip between the modified surface and the surface in which it is in contact.

As used herein, the term "work piece" refers to a metal body being produced using solid free form fabrication.

The term "computer assisted design model" or "CAD-model" as used interchangeably herein refers to any known or conceivable virtual three-dimensional representation of the object that is to be formed which may be employed in the control system of the arrangement according to the second aspect of the invention: to regulate the position and movement of the holding substrate and to operate the welding torch with integrated wire feeder such that a physical object is built by fusing successive deposits of the metallic material onto the holding substrate in a pattern which results in building a physical object according to the virtual three-dimensional model of the object. This may for instance be obtained by forming a virtual vectorized layered model of the three-dimensional model by first dividing the virtual three-dimensional model into a set of virtual parallel layers and then dividing each of the parallel layers into a set of virtual quasi one-dimensional pieces. Then, the physical object may be formed by engaging the control system to deposit and fuse a series of quasi one-dimensional pieces of the metallic material feed onto the supporting substrate in a pattern according to the first layer of the virtual vectorized layered model of the object. Then, repeating the sequence for the second layer of the object by depositing and fusing a series of quasi one-dimensional pieces of the weldable material onto the previous deposited layer in a pattern according to the second layer of the virtual vectorized layered model of the object. Repetition continues the deposition and fusing process layer by layer for each successive layer of the virtual vectorized layered model of the object until the entire object is formed. However, the invention is not tied to any specific CAD-model and/or computer software for running the control system of the arrangement according to the invention, and nor is the invention tied to any specific type of control system. Any known or conceivable control system (CAD-model, computer software, computer hardware and actuators etc.) able to build metallic three-dimensional objects by solid freeform fabrication may be employed. The control system can be adjusted to separately operate a first welding torch, such as a PTA torch, to pre-heat the surface of the base material and, in some applications, at least partially melt a portion of the surface to form a molten pool, and a second welding torch, such as a PTA torch, to melt the feed wire of metallic material onto the preheated surface and/or into the molten pool.

B. Wire Position Control System

It has been determined that the deposition rate of molten metal to a forming work piece being produced by a the freeform fabrication process can be increased using a wire position control system that maintains a metal wire in the proper position so that the metal wire continuously can be fed to the welding torch and maintained at an appropriate position within the arc of the welding torch to facilitate heating and melting of the metal wire. The wire feed speed can be maintained substantially constant so that metal wire is continuously being fed to the welding torch to be melted onto the work piece. The continuous feed of metal wire to the welding torch in the proper position prevents an unwanted discontinuous deposition of metal to the work piece. Any discontinuity of deposition can result in imperfections, irregularities, and flaws in the work piece, which ultimately could lead to delamination, fatigue or cracking of the final product, potentially rendering it unusable for its intended purpose. By maintaining the metal wire in the proper position with respect to the heat source emitted by the welding torch, the rate of continuous feed of metal wire can be increased, allowing the rate of deposition of melted metal to the work piece to increase. Accordingly, the constant proper placement of the metal wire in the heat source emitted by the welding torch increases the efficiency of the freeform fabrication process.

A more complete understanding appreciation of the present invention and its scope can be obtained from the accompanying drawing, which is briefly summarized below, from the following detailed descriptions of presently preferred embodiments of the invention, and from the appended claims.

As shown in FIG. 1, the metal wire arc accuracy system includes an adjustable guide support frame 500 to which the metal wire supply components are attached, and a fixed main support frame 900. The main support frame 900 includes a holding unit that includes a pivot joint 800, a rotatable support piston 810 engaged with the pivot joint 800, a support 820 that encompasses the rotatable support piston 810, and a connector 830 connected to the rotatable support piston 810 and pivotably supporting the rotatable support piston 810. The holding unit is attached to the main support frame 900. The holding unit can be attached via welds, screws, bolts or other connecting devices. In the embodiment shown in FIG. 1, the holding unit is attached to the main support frame 900 by screws attaching the support 820 to the main support frame 900. The main support frame is fixed in position. The main support frame 900 can include perforations, holes or cut-outs or combinations thereof, such as illustrated in FIG. 1, to dissipate heat. Excess heat can cause deformation of the frame.

The rotatable support piston 810 is rotatable around a horizontal axis. The rotatable support piston 810 is coupled to the pivot joint 800, and the pivot joint 800 is attached to one face of the adjustable guide support frame 500. The main support frame 900 can be of any material suitable to support the components attached to the frame. In some embodiments, the fixed main support frame 900 can be steel, stainless steel or a nickel alloy such as an inconel alloy. The connector 830 is attached to a distal end of the rotatable support piston 810 and suspends the rotatable support piston 810 within support 820. The connector 830 can include any suitable construction and arrangement of bearings, bearing races, bearing cones, axles, or bushings or combinations thereof to allow rotation of the rotatable support piston 810.

The opposite distal end of rotatable support piston 810 is coupled to a pivot joint 800 attached to the adjustable guide support frame 500. The rotatable support piston 810 is of sufficient mechanical strength to physically withstand the tensile, shear, and torsional forces of supporting the adjustable guide support frame 500 in its suspension from the main support frame 900. Rotatable support piston 810 can be of any material suitable to support the components attached to the piston. In some embodiments, the support piston 810 can be stainless steel, carbon steel, chromoly steel, or a nickel alloy such as an inconel alloy. For example, the piston can be fabricated from AIS 303 stainless steel. The pivot joint 800 can include a swivel. The pivot joint 800 allows the adjustable guide support frame 500 to be variably swiveled about a horizontal axis such that the adjustable guide support frame 500 can be positioned closer to or further from the fixed main support frame 900. This repositioning of the adjustable guide support frame 500 relative to the fixed main support frame 900 results in the distal end of the metal wire 180 being repositioned relative to the arc of the PTA torch 600. The adjustable guide support frame 500 is made of a material having sufficient mechanical strength to physically withstand the tensile, shear, and torsional forces of supporting the components attached to the adjustable guide support frame 500. Exemplary materials include steel, carbon steel, stainless steel, Invar steel (also known as Invar 36), titanium and titanium alloys, nickel and nickel alloys, such as inconel. In some applications, guide support frame 500 contains Invar steel (containing 36% nickel). The guide support frame 500 can include perforations, holes or cut-outs or combinations thereof, such as illustrated in cut-out 550, to dissipate heat. Excess heat can cause deformation of the frame and possible permanent misalignment. The cut-outs also reduce the weight of the adjustable guide support frame 500.

The pivot joint 800 can include any suitable construction and arrangement of bearings, bearing races, bearing cones, axles, or bushings or combinations thereof to allow rotation of the rotatable support piston 810 and the adjustable guide support frame 500. The pivot joint 800 is made of a material having sufficient mechanical strength to physically withstand the tensile, shear, and torsional forces of supporting the components attached to the adjustable guide support frame 500. In some embodiments, the pivot joint 800 can be aluminum or aluminum alloy, titanium or titanium alloy, steel, stainless steel, or a nickel alloy such as an inconel alloy. For example, the pivot joint 800 can be fabricated from EN AW-6063T6/6082T6 aluminum alloy. Guide support frame 500 can be of any material suitable to support the components attached to the frame. In some embodiments, the pivot joint 800 can be steel, stainless steel, carbon steel, chromoly steel, nickel, or a nickel alloy such as an inconel alloy. The components of the pivot joint 800 are of a material resistant to modulation at the temperatures generated during solid freeform fabrication. For example, the material can be selected to be compatible with temperatures in the range of from about 15° C. to about 100° C. The pivot joint 800 permits the adjustable guide support frame 500 to displace horizontally relative to the pivot axis. The pivot joint 800 can be fully sealed and can handle rotary movement in either direction. The pivot joint 800 can include antifriction bearing swivels or roller bearing swivels or combinations thereof. It should be understood that any type of pivoting device that will permit rotary motion of a load-carrying support can be used.

A motor 570 is attached to and rotates a threaded member that is functionally connected to plate 920 connected to the main support frame 900. Rotation of the threaded member produces and controllably adjusts the horizontal displacement of the adjustable guide support frame 500. The motor 570 can be in communication with and controlled by a motor controller (not shown) that can control the movement of the threaded member, such as by limiting the amount and the direction the threaded member is rotated. The motor controller can include computer software and computer hardware and optionally actuators, and can be configured to modulate the power provided to the motor, or regulate the speed and direction and duration of movement of the motor, or permit automatic of activation of the motor in response to a signal, or any combination thereof. The invention is not tied to any specific computer or computer software for running the motor controller. The motor controller can be separate from or under the control of the control system.

The threaded member can be a screw or bolt or similar connector having a screw thread mechanism that can engage with an internally threaded opening in plate 920 attached to the main support frame 900 to receive the threaded member. The threaded member attached to the motor 570 engages the internally threaded opening in plate 920 to form a threaded engagement between the adjustable guide support frame 500 and the main support frame 900 by which the adjustable frame 500 moves closer to or further from the fixed main support frame 900 in response to the rotation of the motor-driven threaded member. When motor 570 in mechanical communication with the threaded member rotates the threaded member in one direction, the adjustable guide support frame 500 is repositioned toward the fixed main support frame 900, and when motor 570 rotates in the opposite direction adjustable guide support frame 500 is repositioned away from the fixed main support frame 900. A movable sleeve that can extend and retract can be included to shield and protect the threaded member.

The motor 570 can be a conventional direct-current (DC) motor driven by a power control signal, or can be a stepper motor that allows a precise amount of rotation of the threaded member by electronically controlling the number of energizing pulses supplied to the motor. The motor 570 can operate to rotate in the forward and reverse directions. A control unit can be programmed to control rotation of the motor in the forward and reverse directions in response to an indication that the metal wire needs to be repositioned to be in a desired or preferred position relative to the heat source of the welding torch. The motor 570 can include an electronic control unit in communication with the motor 570 that can be programmed to stop rotation of the stepper motor virtually instantaneously once the distal end of the metal wire has been properly positioned at the desired location in the arc of the welding torch.

A welding torch is maintained in position by being attached to the fixed main support frame 900. The welding torch can emit a heat source, such as a plasma arc, a laser beam, an electron beam or the like. Exemplary welding torches include plasma arc welding torches, gas tungsten arc welding torches, gas metal arc welding torches, metal inert gas welding torches, tungsten inert gas welding torches, laser welding torches, electron beam welding torches, and any combination thereof. The heat source of the welding torch melts the metal wire delivered to the appropriate position in relation to the heat source of the welding torch.

An exemplary welding torch is a PTA torch. The PTA torch can be of any configuration capable of creating an electric arc to heat and melt the metal wire, such as gas metal arc welding (GMAW), particularly using non-reactive gases to make the arc. The metal wire is made to melt in the plasma produced by torch using an electric arc, and the melting metal wire is deposited onto the preheated area or molten pool on the workpiece to add to, and to form, the near net shape metal bodies. The feed rate and positioning of the metal wire can be controlled and modulated in accord with the effect of the power supply to the PTA torch in order to ensure that the metal wire is being continuously heated and is melted when it reaches the intended position above the preheated area or molten pool in the base material. Solid freeform fabrication systems can use one or more welding torches. Exemplary welding systems are described in Guldberg (WO 2011/019287), Ireland et al. (U.S. Pat. No. 7,220,935); Comon et al. (U.S. Pat. No. 9,145,832); Cooper et al. (U.S. Pat. App. Pub. No. US 2010/0276396); Biskup et al. (US Pat. App. Pub. No. 2013/0140280); and Stempfer (US. Pat. App. Pub. No. 2014/0061165).

The metal wire generally is provided to a welding torch as a straight wire without curves, kinks or deformations. The wire arc accuracy system provided herein can be used with any solid freeform fabrication system, whether the welding torch includes a PAW torch such as for example a plasma transferred arc (PTA) torch, an electron beam, or a laser, or a combination thereof, to melt the metal wire. The wire arc accuracy system provided herein can be used with a solid freeform fabrication system that uses one welding torch or a combination of welding torches. When a combination of torches is used, all of the torches can be the same, or a combination of different torches can be used. In some applications, a single welding torch containing a plasma transferred arc (PTA) torch, an electron beam, or a laser can be used. In some applications, a double welding torch system can be used, where a first torch forms a molten pool on the surface of a work piece and a second torch melts a metal wire into the molten pool. The first torch can contain a plasma arc (PAW) torch, an electron beam, or a laser and the second torch can contain a plasma arc (PAW) torch, an electron beam, or a laser. Thus, although exemplary embodiments are described using PAW torches such as PTA torches, these examples are not limiting. The adjustment of the metal wire described herein can be implemented with any type of heat source described herein, including laser torches and electron beam torches. When using laser torches, instead of positioning the end of the metal wire in the arc as described, the end of the metal wire is being placed in the laser beam. Likewise, when using electron beam torches, the position of the end of the metal wire is adjusted to be in the electron beam rather than the arc as described in conjunction with the use of PTA or other PAW torches.

In an exemplary embodiment, the wire arc accuracy system provided herein can be used in a two torch system, such as described in Stempfer (US Pat. App. Pub. No. US2014/0061165). In such systems, it is important to be able to deliver a straight metal wire in order to maintain alignment of the metal wire in the arc of the welding torch. As shown in FIG. 1, a first PAW torch 600 and second PAW torch 610 are attached to the fixed main support frame 900. The torches 600 and 610 can be attached to torch support 650, which is attached to the fixed main support frame 900 via support 940. PAW torch 600 and PAW torch 610 are fixed in position to maintain their position relative to each other.

As configured in FIG. 1, PAW torch 610 interacts with a surface of the base material to preheat at least a portion of the base material at the position at which the metallic material is to be deposited. The PAW torch 600 then heats and melts the metal wire such that molten metallic material from the melted wire is deposited onto the base material and onto the into preheated or molten or partially molten area of the base material if preheating was carried out. Moving the base material relative to the position of the first and second PAW torches in a predetermined pattern allows the successive deposits of molten metallic material to form the three-dimensional object.

The components of the wire supply system are attached to the adjustable guide support fame 500. As shown in FIG. 1, a wire guide 490, a free wheel device 485, a rotation counter 480, and a master feed device that includes a first motorized wire feeder 475, a motor 470, a rotation counter 465, and a second motorized wire feeder 460 are attached to wire supply frame connector 495, which is attached to the adjustable guide support frame 500. The master feed device can monitor for slippage of the metal wire 180 to make sure that no kinks, bends or other permanent deformations are introduced into the metal wire 180 as it traverses the wire supply system. Slippage can be detected by comparing the rotation of the free wheel device 485 to the rotation of the master feeder.

Wire guide 490 can include a first grooved roller and a second grooved roller forming a pathway therebetween through which the metal wire 180 can pass. The grooved rollers optionally can be biased by a spring into engagement with the metal wire 180. Free wheel device 495 can include a first grooved roller and a second grooved roller forming a pathway therebetween through which the metal wire 180 can pass. The grooved rollers optionally can be biased by a spring into engagement with the metal wire 180. The free wheel device 495 can receive metal wire 180 after it has traversed wire guide 490 and feed the metal wire 180 into rotation counter 480.

The master feed device includes a motor 470 that is attached to and can drive the grooved rollers of motorized wire feeders 460 and 475. The grooved rollers of motorized wire feeders 460 and 475 can include protrusions in the grooves thereof that can engage with the metal wire 180 and advance the metal wire 180 through the rollers. The protrusions in the grooves can increase the frictional forces between the roller grooves and the metal wire 180 allowing the rollers to frictionally engage with metal wire 180 and advance it through the rollers. The grooved rollers can be made of a wear resistant metal. The grooved rollers can be or contain a coating of steel, carbon steel, stainless steel, chromoly steel, stainless steel, titanium, titanium alloy, nickel or nickel alloy.

After exiting the motorized wire feeder 460, the metal wire 180 moves through wire protector 400 to provide the metal wire to the guide 120. The wire protector 400 can minimize any contact with other elements of the system and provides a straight pathway for delivery of the metal wire 180 to the guide 120. Wire protector 400 can be made of any material suitable for conveying metal wire 180. The wire protector 400 can be or can contain an electrically insulative ceramic. Such ceramics are known in the art and can include the oxides or nitrides of Al, B, Zr, Mg, Y, Ca, Si, Ce, In and Sn and combinations thereof (e.g., see U.S. Pat. No. 6,344,287 (Celik et al., 2002); U.S. Pat. No. 4,540,879 (Haerther et al., 1985); and U.S. Pat. No. 7,892,597 (Hooker et al., 2011)). The wire protector 400 can be or contain aluminum nitride, aluminum oxide, magnesium nitride, magnesium oxide, quartz, silicon nitride, boron nitride, zirconium oxide, zirconium dioxide and mixtures and combinations thereof. An exemplary ceramic is RAPAL® 100 aluminum oxide (Rauschert Heinersdorf-Pressing GmbH, Pressing, Germany). The wire protector 400 can contain a central bore through which the metal wire 180 can pass. The central bore typically is of a shape that easily accommodates the metal wire 180. For example, when the metal wire 180 has a circular cross section, the wire protector 400 can include a central bore with a circular cross section.

The insulative ceramic can include a surface treatment on the surface that faces the metal wire to reduce the roughness of the surface facing the metal wire. The surface treatment can help to minimize or eliminate scratching or scoring of the metal wire as it passes through the insulative ceramic. For example, the surface of the insulative ceramic facing the metal wire can be treated to include a surface glaze that reduces the friction-causing attraction forces between the wire protector surface and the wire. Laser glazing treatment can be used to reduce surface pores, cracks or deformations on the surface of the ceramic surface to reduce friction and produce a smoother insulative ceramic surface. The surface of the ceramic surface can be polished. The surface of the ceramic surface can be treated to include a diamond-like-carbon coating. A synthetic fluoropolymer, such as polytetrafluoroethylene (PTFE) can be applied to the ceramic surface to reduce friction. The surface treatment can help to minimize the formation of small pieces of metal wire that can form due to interaction of the metal wire with a rough insulative ceramic surface.

The guide 120 is attached to the adjustable guide support frame 500 via support element 300. The wire protector 400 is attached to support element 300 by connector 450. The motor 470 can be in communication with a control system in communication with the welding device, and the control system control system can send a signal to the motor 470 to advance metal wire 180 to the welding torch device 600. Motor 470 can continuously advance metal wire 180 to the welding torch device 600 unless it receives a signal from a control system to stop advancing the metal wire 180. The guide can be of any material compatible with plasma arc welding. In some embodiments, the guide is or contains titanium or a titanium alloy containing Ti in combination with one or a combination of Al, V, Sn, Zr, Mo, Nb, Cr, W, Si, and Mn. For example, the guide can be a material containing Cu and W. Exemplary titanium alloys include Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, and Ti-48Al-2Nb-0.7Cr-0.3Si.

The control system can include a computer processer or central processing unit (CPU), CPU display, one or more power supplies, power supply connections, signal modules as inputs and/or outputs, integrated shielding of analog signals, storage devices, circuit boards, memory chips or other storage medium, a non-transitory computer-readable storage medium having a computer-readable program embodied therein, or any combination thereof. The computer-readable program can contain appropriate software for partially or completely automating any one or combination of systems. The computer-readable program can contain appropriate software for monitoring and/or adjusting a parameter, such as actuation of a motor, motor speed, duration of movement of the motor, temperature, pressure, position of the workpiece, deposition rate, image capture from an imaging device and its analysis, or any combination thereof. Exemplary control systems include, but are not limited to, the SIMATIC-57-1500 from Siemens AG (Munich, Germany), the IndraMotion MTX system available from Bosch Rexroth AG (Lohr am Main, Germany), and the SIGMATEK C-IPC compact industrial computer system available from SIGMATEK GmbH & Co. KG (Lamprechtshausen, Austria).

Also attached to support element 300 can be the contact tip assembly 210, which includes the electric contact unit 200 and the electrical connection 230. The electric contact unit 200 contains the replaceable contact tip that comes into contact with metal wire 180. The electrical connection 230 allows the metal wire 180 to be electrically connected to the electric power supply.

The contact unit 200 can be or contain copper or a copper alloy. The copper alloy can contain any of copper ASTM Classes II through X. The copper alloy can include copper in combination with Ag, Al, Be, Bo, Cr, In, Mg, Ni, Sn, Sr, W, Zn or Zr or combinations thereof. For example, the contact unit can be a material containing Cu and W, such s a CU/W composite.

The electric contact unit 200 supplies the electric current to the metal wire 180 via a replaceable contact tip of the electric contact unit 200. The replaceable contact tip is or contains copper or a copper alloy. The copper alloy can contain any of copper ASTM Classes II through X. The copper alloy can include copper in combination with Ag, Al, Be, Bo, Cr, In, Mg, Ni, Sn, Sr, W, Zn or Zr or combinations thereof. The contact tip can be a material containing Cu and W, such as a Cu/W composite. An example is Brocadur WK20 (Brouwer Metaal B.V, Holland, Netherlands), which contains about 80% W and 20% Cu. Any appropriate contact tip arrangement can be used. For example, a contact tip can include an axial hole for feeding the wire, the contact tip being provided with a V-shaped notch which extends from the outer wall to the axis, the axial hole leading to the bottom of the notch. The bottom of the notch can be inclined towards the axis adjacent to a nozzle. The contact tip can include a mechanism for pressing the welding wire against the notch bottom and walls, the mechanism including a spring fitted into the notch and resting on the welding wire.

Another contact tip arrangement can include an apertured copper nozzle from which a consumable electrode, in the form of a straightened out metal wire being fed from a wire supply, is made to pass through at a controlled velocity. Both the copper nozzle and the workpiece are electrically connected to an electric power supply setting up an electric potential between them. When the metal wire passes through the copper nozzle it comes into contact with the nozzle and is thus electrically connected to the electric power supply. When the tip (the distal end section) of the metal wire reaches a certain distance above the deposition/welding area, the electric potential creates an electric arc extending from the tip of the metal wire and down to the deposition/welding area. The electric arc melts the tip of the incoming metal wire and thus deposits molten metallic material onto the deposition area.

In the embodiment shown in FIG. 1, a guide 120 is positioned below an electric contact unit 200. The electric contact unit 200 can contain a replaceable contact tip electrically connected to electrical connection 230 for connecting the contact tip with a power source, such as a DC power source. The electric contact unit 200 can exert a downward pressure against the contact tip to press the contact tip 215 into contact with the metal wire 180. The downward pressure to keep the contact tip into contact with the metal wire can be achieved, for example, by using a spring. When the contact tip 215 is in contact with the metal wire 180, an electric circuit with PTA torch 600 is completed.

The guide 120 and the electric contact unit 200 are shown connected to a support element 300. The guide 120 and the electric contact unit 200 can be thermally isolated from the support element 300 by including a thermally insulating material between the contact points. The metal wire 180 is provided to one end of the guide 120. The metal wire 180 passes through the guide 120 and exits the other end of the guide 120, where it is positioned in the plasma arc above the deposition point of the workpiece. The guide 120 can be of any shape, as long as it is configured to receive a metal wire 180 and allow the metal wire 180 to pass through the guide 120 without hindrance. The shape of the outer portion of the guide 120 can have a cross section that is circular, oval, elliptical, or polygonal, for example, square, triangular, rectangular, pentagonal, hexagonal, octagonal, or any combination thereof.

The guide 120 can be fluid cooled. For example, the guide can be designed to include an internal path for fluid flow through the guide. The fluid can be any suitable fluid, such as water, a $C_1$-$C_5$ alcohol, a polyalphaolefin, an alkylene glycol, such as ethylene glycol or propylene glycol, or mixtures thereof. In some embodiments, the cooling fluid is water, a mixture of water and propylene glycol, or a mixture of water and ethylene glycol. The cooling fluid can include additives, such as salts, corrosion inhibitors, pH adjusters or combinations thereof.

The guide can be electrically insulated from the metal wire using an electrically insulating lining containing an electrically insulating material suitable for use in the conditions to which the guide would be exposed during welding. The electrically insulating material can be or contain an electrically insulative ceramic. Such ceramics are known in the art and can include the oxides or nitrides of Al, B, Zr, Mg, Y, Ca, Si, Ce, In and Sn and combinations thereof (e.g., see U.S. Pat. No. 6,344,287 (Celik et al., 2002); U.S. Pat. No. 4,540,879 (Haerther et al., 1985); and U.S. Pat. No. 7,892,597 (Hooker et al., 2011)). The electrically insulating material can be or contain aluminum nitride, aluminum oxide, magnesium nitride, magnesium oxide, quartz, silicon nitride, boron nitride, zirconium dioxide and mixtures and combinations thereof.

The electrically insulating lining can contain a central bore through which the metal wire can pass. The central bore typically is of a shape that easily accommodates the metal wire. For example, when the metal wire has a circular cross section, the electrically insulating lining includes a central bore with a circular cross section. The central bore of the electrically insulating lining generally is of a diameter that is slightly larger than the diameter of the metal wire. For example, if a metal wire having a diameter of 1.6 mm is being used, the insulation in the central bore can have an inner diameter of about 2 mm to 3 mm to allow for ease of traverse of the wire through the central bore. Is some configurations, the very tip of the wire outlet can have an electrically insulating lining having an inner diameter different from the inner diameter of the electrically insulating lining used elsewhere in the guide. For example, when a wire having a diameter of 1.6 mm is being used, while the insulation in the central bore can have an inner diameter of about 2 mm to 3 mm, the very tip of the wire outlet can have an electrically insulating lining having an inner diameter of about 1.8 mm. The inner diameter of the electrically insulating lining at the very tip can be selected so that it is large enough for the wire to go through but small enough to guide the wire in a desired direction.

The diameter of the metal wire, according to certain embodiments of the present invention, can range from about 0.8 mm to about 5 mm. The metal wire can have any practically implementable dimension, e.g., 1.0 mm, 1.6 mm, 2.4 mm, etc. The feed rate and positioning of the metal wire can be controlled and modulated in accord with the effect of the power supply to the welding torch in order to ensure that the metal wire is being continuously heated and is melted when it reaches the intended position above the base material, such as above a molten pool in the base material. The heat source of the welding torch can include a plasma transferred arc (PTA) torch, an electron beam, or a laser, or a combination thereof, to melt the metal wire.

When the electrically insulating lining includes an insulative ceramic in the vicinity of the central bore through which the metal wire passes, the insulative ceramic can include a surface treatment to reduce the roughness of the surface of the metal wire insulative ceramic. The surface treatment can help to minimize or eliminate scratching or scoring of the metal wire as it passes through the electrically insulating lining. For example, the surface of the electrically insulating lining can be treated to include a surface glaze that reduces the friction-causing attraction forces between the lining surface and the electrode. Laser glazing treatment can be used to reduce surface pores, cracks or deformations on the surface to reduce friction and produce a smoother insulative ceramic surface. The surface of the electrically insulating lining can be treated to include a diamond-like-carbon coating. PTFE can be applied to the surface of the electrically insulating lining to reduce friction. The surface treatment can help to minimize the formation of small pieces of metal wire that can form due to interaction of the metal wire with a rough insulative ceramic surface The electrically insulating lining of the guide 120 can be of any shape, as long as it is configured to have a center bore that receives a metal wire 180 and allows the metal wire 180 to pass through the electrically insulating lining. The shape of the outer portion of the insulating lining can have a cross section that is circular, oval, elliptical, or polygonal, for example, square, rectangular, pentagonal, hexagonal, or octagonal.

In the embodiment depicted, the electric contact unit 200 can contain a replaceable contact tip that is brought into contact with the metal wire. The replaceable contact tip within the electric contact unit 200 contains copper or a copper alloy, or a copper composite, such as a combination of copper and tungsten. Contact tips are commercially available, and the invention is not limited to any specific type of contact tip. An exemplary contact tip is prepared from a combination of tungsten and copper, available from Brouwer Metaal B.V. (Holland, Netherlands), such as Brocadur WK20, which contains about 80% W and 20% Cu. The contact tip electrically connects the metal wire to a direct current power source, which is also connected to the target region of the metal body being formed by free form fabrication. In some embodiments, the electrical connection is made so that the metal wire is the cathode and the target region is the anode. In some embodiments, the electrical connection is made so that the metal wire is the anode and the target region is the cathode. When the metal wire enters the arc of PAW torch, such as a PTA torch, the plasma plume including electric arc delivers a highly concentrated heat flow to a small surface area of the target region with excellent control of the areal extension and magnitude of the heat flux being supplied from the PTA torch. A PTA torch has the advantage of providing stable and consistent arcs with little wandering and good tolerance for length deviations between the cathode and anode. The PTA torch can have an electrode made of tungsten and a nozzle made of copper or copper alloy. However, the invention is not tied to any specific choice or type of PTA-torch. Any known or conceivable device able to function as a PTA torch can be used.

The replaceable contact tip can be attached to a cylindrical support within the electric contact unit. In some embodiments, the contact tip is thermally insulated from the cylindrical support by using an intervening thermal insulating material. Any thermal insulating material that can withstand the temperatures to which the contact tip could be exposed are appropriate for use within the electric contact unit. An exemplary thermal insulating material is ceramic, which also can be selected to be electrically insulative, which would minimize or prevent any of the electric current from being transferred from the contact tip to the electric contact unit. Any of the ceramics described above could be used to construct an appropriate fitting for attaching the contact tip to the cylindrical support within the electric contact unit.

The contact tip within the electric contact unit is maintained in contact with the metal wire to insure constant current to the metal wire and a completed circuit of containing the power source, metal wire and the target area. In some embodiments, the contact tip is maintained in contact with the metal wire via a contact tip pressing assembly. The contact tip pressing assembly can be part of the electric contact unit, or can be a separate element. The downward pressure to keep the contact tip into contact with the metal wire 180 can be achieved by using, e.g., a spring, hydraulics, mechanized screws or a motorized piston assembly. When a spring is used, the spring can be selected to exert a force of appropriate strength or magnitude so that it is not so strong that the contact tip scratches the metal wire 180 but strong enough to maintain contact between the contact tip and the metal wire 180. Depending on the configuration chosen, a spring, such as a compression spring, having a spring constant in the range of from about 0.001 to about 10 N/m can be used to force the contact tip down against metal wire 180. Instead of, or in additional to, a spring, the pressing assembly can include a hydraulic cylinder that can be used to provide a force to keep the contact tip into contact with the metal wire. The contact tip pressing assembly can be configured to exert from about 100 to about 800 grams pressing the wire into contact with the contact tip.

In some embodiments, the contact tip is maintained in contact with the metal wire via a wire pressing assembly. The wire pressing assembly can exert an upward pressure against the metal wire 180 to press the metal wire 180 into contact with the contact tip. The upward pressure to keep the metal wire 180 in contact with the contact tip can be achieved, for example, by using an L-shaped clip connected to a spring, hydraulics, mechanized screws or a motorized piston assembly. The spring can be selected to exert a force of appropriate strength or magnitude so that it is not so strong that the contact tip 180 scratches the wire, but strong enough to maintain contact between the contact tip and the metal wire 180. Depending on the configuration chosen, a spring, such as a compression spring having spring constant in the range of from about 0.001 to about 10 N/m) can be used to force the wire 180 up toward the contact tip. Hydraulic pressure on a hydraulic piston also can be used to force the wire toward the contact tip. The wire pressing assembly can be configured to exert from about 100 to about 800 grams pressing the wire into contact with the contact tip. In some embodiments, a combination of a contact tip pressing assembly to press the contact tip downward, and a wire pressing assembly to press the metal wire upward, can be used.

Also attached to the adjustable guide support frame 500 is a detector 700 that can detect the position of the distal end of metal wire metal wire 180 in the arc of PTA torch 600. The detector 700 can be attached to the adjustable guide support frame 500 via detector support 710. Any detector that allows the position of the distal end of metal wire 180 relative to the heat source, such as the arc of PAW torch 600, the laser beam form a laser torch, or the electron beam from an electron beam torch can be used. The detector can include a camera, an optical sensor, an image sensor, a photodiode, a photodiode array, a complementary metal-oxide-semiconductor (CMOS) sensor, a charge coupled device (CCD), an active-pixel sensor, an electron sensor, an electron phenomena detecting mechanism, or a combination thereof.

An exemplary detector include one or more cameras that allows visualization of the position of the distal end of metal wire 180 with respect to the arc of the PAW torch 600 or alternatively, the laser beam form a laser torch, or the electron beam from an electron beam torch. A high dynamic range CMOS camera can be used as the detector 700 to obtain color or black and white images of the plasma arc, laser beam, or electron beam and the position of the distal end of the metal wire 180. The images can be displayed live on a display device, such as a monitor. The display device can include a flat panel LED display, a liquid crystal (LCD) display, a thin film transistor display, or a cathode ray tube display. The field of view of the camera can be adjusted by adjusting the camera and/or by electronic adjustment of the field of view of the camera. The detector 700 can be positioned so that its focal plane is in line with the distal end of the metal wire 180 and the distal end of the metal wire 180 is generally within the center of the field of view of the camera. The camera is positioned in imaging relation to the PAW torch, laser torch, or the electron beam torch and distal end of the metal wire 180 such that the centerline of the distal end of the metal wire 180 is positioned within the field of view of the camera. A band pass filter can be placed in front of the camera in order to filter out noise and/or to reduce the amount of light produced by the arc received by the camera in order to improve the contrast visualization of the distal end of the metal wire 180. Complementing the camera, a photo detector with active feedback can be used to automatically adjust the exposure time, gain, gamma, and tone mapping or any combination thereof, to improve the contrast.

The filter used can be selected so that a wavelength specific to the heat source of the welding torch either is blocked by the filter or is the only dominant wavelength to pass through the filter, providing a mechanism for distinguishing the heat source for the heated substrate. A video imaging sensor can be programmed to detect the desired selected wavelength. The detector can be configured so that it is facing the welding torch and monitors the light emitted during the welding process. Changes in the wavelengths detected can be used to determine that the metal wire is not properly aligned within the heat source of the welding torch. Signals generated by the imaging system, or converted signals generated by the control system, then can be used to activate the repositioning system to change the position of the distal end of the wire. Repositioning also can be preformed manually by an operator in response to the video image.

The one or more detectors 700 can be in communication with the control system, which also is in communication with the motor 570. When the control system receives a signal from detector 700 that the distal end of the metal wire 180 needs to be repositioned, the control system can provide a signal to the motor 570 to modulate the angular relationship between adjustable guide support frame 500 and fixed main support frame 900 to move the distal end of the metal wire 180, such as to reposition or maintain the distal end within the arc of the PAW torch 600. A signal processing control box, such as a computer with signal processing software designed for processing signals obtaining from a camera) can be used to process the data from the detector 700 and deduce the center point of the wire, such as based on fixed reference points on the devices attached main support frame in its field of view (e.g, torch support 650 or melter torch 600 (in its field of view), and based on dynamic features such as arc shape, arc concentration, center line of the deposited string, droplet deflection, etc. The deduced angular correction factor to adjust the guide support frame 500 can be displayed on a monitor for manual correction, or the signal processing control box can automatically send the information electronically via software or via direct signal interface to the motor 570. Accordingly, signals from detector 700 can be continuously monitored and used to identify the distal end of the metal wire needs to be repositioned. In some application, feedback control mechanisms responsive to signals from detector 700 can be used to adjust the guide support frame 500. In exemplary embodiments, the distal end of the metal wire is continuously repositioned in response to the continuous monitoring detecting its position to ensure that the distal end of the metal wire is or remains in the heat source emitted by the welding torch. In exemplary embodiments the heat source is either the plasma arc, the laser beam, the electron beam or other emission by the welding torch used.

The metal wire 180 can be of any metal used in torch welding. The metal wire can be or contain titanium. The metal wire can be or contain a titanium alloy containing Ti in combination with one or a combination of Al, V, Sn, Zr, Mo, Nb, Cr, W, Si, and Mn. For example, exemplary titanium alloys include Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2 W-0.5Si, Ti-47Al-2Nb-1Mn-0.5 W-0.5Mo-0.2Si, and Ti-48Al-2Nb-0.7Cr-0.3Si. The metal wire can contain aluminum, iron, cobalt, copper, nickel, carbon, titanium, tantalum, tungsten, niobium, gold, silver, palladium, platinum, zirconium, alloys thereof, and combinations thereof. The metal wire can have a circular cross section. The diameter of the wire can be in the range of from about 0.5 mm to about 5 mm. The metal wire can have any practically implementable dimension, e.g., 1.0 mm, 1.6 mm, 2.4 mm, etc. The melted metal wire can be deposited on the base material in accord with the deposition profile produced using a computer model of the object to be formed such that the object is built by fusing successive deposits of the metallic material onto the base material.

Positioning of the base material and any one or more PAW torches can be accomplished using one or more actuators. In exemplary embodiments, the base material can be repositioned or moved using an actuator tray over which the base material is resting. The actuator tray can move the base material in any direction. In exemplary embodiments the actuator tray can be set on a track or rail system and able to move the base material in any desired direction. Alternatively, the actuator tray may be operated using a mechanical or robotic arm. Similarly, the one or more PAW torches may be moved using one or more actuators. For example, each of the one or more PAW torch may be attached to an independently controlled actuator arm, such as a robotic or mechanical arm. Use of other types of mechanisms for the actuator arm can also be implemented, such as for example rail or track systems. In exemplary embodiments in which two or more PAW torches are used, each PAW torch can be moved independently. In alternative embodiment using two or more PAW torches, the position of two or more PAW torches can be fixed relative to each other and one or more actuator arms move the two or more PAW torches simultaneously. In exemplary embodiments, the actuator tray is the only actuator used, keeping the one or more PAW torches at a fixed position during deposition. In alternative embodiments, the actuator tray moves the base material only within two direction in one plane, while one or more actuator arms move the one or more PAW torches in only one direction, for example perpendicularly to the plane in which the actuator tray moves. The opposite may also be true, where the one or more actuator arms move the one or more PAW torches in two directions within a plane while and the actuator tray moves the base material along a single direction. In alternative embodiments, the base material is maintained in a fixed position during deposition, and one or more actuator arms are used to move the one or more PAW torches. In yet an alternative embodiment, an actuator tray and one or more actuator arms are all used to move the base material and the one or more PAW torches. A computer-aided manufacturing (CAM) system or software can direct the movement of the actuator tray, the first actuator arm, the second actuator arm or any combination thereof in response to the deposition profile.

Although the preceding description contains significant detail, it should not be construed as limiting the scope of the invention but rather as providing illustrations of various embodiments of the invention.

It will be apparent to those skilled in the art that various modifications and variation can be made in the present invention without departing from the scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.
120 Guide
180 Metal wire
200 Electric contact unit
210 Contact tip assembly
230 Electrical connection
300 Support element
400 Wire protector
450 Connector
460 Motorized rollers
465 Rotation counter
470 Motor 475 Motorized rollers
480 Rotation counter
485 Guide rollers
490 Guide rollers
495 Wire supply frame connector
500 Adjustable guide support frame
550 Cut-out
570 Motor
600 First PTA torch
610 Second PTA torch
650 Torch support
700 Detector (camera)
710 Detector support
800 Pivot joint
810 Rotatable support piston
820 Support
830 Connector
900 Main Support frame
920 Plate (engaging the threaded member driven by the motor)
930 Support
940 Support

What is claimed is:

1. A metal wire positioning system, comprising:
a plate containing an internally threaded opening, the plate fixedly attached to a main frame;
a holding unit attached to the main frame, the holding unit comprising a rotatable support piston engaged with a pivot joint, and a connector connected to the rotatable support piston and pivotably supporting the rotatable support piston;
an adjustable guide support frame rotatably connected to the main frame by the holding unit via the pivot joint and suspended by the rotatable support piston;
a wire guide attached to the adjustable guide support frame;
a motor attached to the adjustable guide support frame, the motor attached to a threaded member that is engaged with the internally threaded opening in the plate such that the adjustable guide support frame is repositioned toward or away from the main frame in response to a rotation of the threaded member; and
a detector that detects the position of an arc of welding torch.

2. The system of claim 1, further comprising a control system in communication with the motor, the control system controls a rotation of the motor and thereby the movement of the threaded member.

3. The system of claim 2, wherein the control system controls an amount and a direction in which the threaded member is rotated.

4. The system of claim 1, wherein the threaded member is a screw or bolt.

5. The system of claim 1, wherein rotation of the threaded member by the motor in one direction repositions the adjustable guide support frame toward the main frame, and rotation of the threaded member by the motor in the opposite direction repositions the adjustable guide support frame away from the main frame.

6. The system of claim 1, further comprising a movable sleeve that encircles the threaded member.

7. The system of claim 1, wherein the motor is a direct current motor driven by a power control signal.

8. The system of claim 1, wherein the motor is a stepper motor.

9. The system of claim 8, the stepper motor allows a rotation of the threaded member in either direction by electronically controlling the number of energizing pulses supplied to the motor.

10. The system of claim 1, wherein the detector is attached to the adjustable guide support frame by a detector support.

11. The system of claim 1, wherein the detector comprises a camera.

12. The system of claim 1, further comprising a master feed device containing a first motorized wire feeder, a wire feeder motor, a rotation counter, and a second motorized wire feeder.

13. The system of claim 12, wherein the wire feeder motor drives the first motorized wire feeder and the second motorized wire feeder.

14. The system of claim 12, wherein the rotation counter is positioned between the first motorized wire feeder and the second motorized wire feeder.

15. The system of claim 14, further comprising a rotation counter positioned before the first motorized wire feeder.

16. The system of claim 1, wherein the main frame comprises a cut-out, perforation or hole.

17. The system of claim 1, wherein the adjustable guide support frame comprises a cut-out, perforation or hole.

18. The system of claim 1, further comprising:
a support element attached to the adjustable guide support frame;
a guiding element attached to the support element; and
a contact tip assembly attached to the support element.

19. The system of claim 18, wherein the contact tip assembly comprises a replaceable contact tip.

20. A system for production of an object of a weldable material by solid freeform fabrication, comprising:
a metal wire positioning system according to claim 1; and
a first welding torch fixedly attached to the main frame.

21. The system of claim 20, further comprising a second welding torch fixedly attached to the main frame.

* * * * *

UNITED STATES PATENT AND TRADEMARK OFFICE
CERTIFICATE OF CORRECTION

PATENT NO. : 10,099,309 B2
APPLICATION NO. : 15/792616
DATED : October 16, 2018
INVENTOR(S) : Brede Vigdal et al.

It is certified that error appears in the above-identified patent and that said Letters Patent is hereby corrected as shown below:

On the Title Page

In Item (72) Inventors, Column 1, please replace:
"Brede Vigdal, Hønefoss (NO);
Hans-Martin Berg Haga, Hønefoss (NO);
Tom-Erik Falla, Hønefoss (NO)"

With:
—Brede Vigdal, Tyristrand (NO);
Hans-Martin Berg Haga, Hønefoss (NO);
Tom-Erik Falla, Jevnaker (NO)—

Signed and Sealed this
Fourteenth Day of May, 2019

Andrei Iancu
*Director of the United States Patent and Trademark Office*